(12) United States Patent
Bonifetto et al.

(10) Patent No.: US 10,948,021 B2
(45) Date of Patent: Mar. 16, 2021

(54) FLANGED WHEEL HUB UNIT AND ASSEMBLY METHOD

(71) Applicant: Aktiebolaget SKF, Gothenburg (SE)

(72) Inventors: Gabriele Bonifetto, Vigone (IT); Paolo Lagori, Nichelino (IT); Roberto Pairetti, Frossasco (IT); Renzo Reiso, Nichelino (IT)

(73) Assignee: AKTIEBOLAGET SKF

( * ) Notice: Subject to any disclaimer, the term of this patent is extended or adjusted under 35 U.S.C. 154(b) by 69 days.

(21) Appl. No.: 16/372,607

(22) Filed: Apr. 2, 2019

(65) Prior Publication Data

US 2019/0323560 A1    Oct. 24, 2019

(30) Foreign Application Priority Data

Apr. 20, 2018  (IT) .................. 102018000004734

(51) Int. Cl.
| | |
|---|---|
| *F16C 43/04* | (2006.01) |
| *F16C 43/08* | (2006.01) |
| *B60B 27/00* | (2006.01) |
| *B60B 27/02* | (2006.01) |
| *F16C 19/18* | (2006.01) |

(52) U.S. Cl.
CPC ............ *F16C 43/04* (2013.01); *F16C 43/083* (2013.01); *B60B 27/0005* (2013.01); *B60B 27/0094* (2013.01); *B60B 27/02* (2013.01); *B60B 2320/10* (2013.01); *B60B 2380/12* (2013.01); *B60B 2380/75* (2013.01); *F16C 19/184* (2013.01); *F16C 2229/00* (2013.01); *F16C 2326/02* (2013.01)

(58) Field of Classification Search
CPC .... F16C 43/04; F16C 43/083; F16C 2229/00; F16C 25/083; B60B 2310/228; B60B 2320/10

See application file for complete search history.

(56) References Cited

U.S. PATENT DOCUMENTS

2010/0220950 A1* 9/2010 Miura ................. B60B 27/0005
                                                                          384/540

FOREIGN PATENT DOCUMENTS

| EP | 2602123 A | 6/2013 |
| EP | 2754905 A1 | 7/2014 |
| WO | 2015124125 A1 | 8/2015 |

OTHER PUBLICATIONS

Search Report from Italy Patent Application No. 102018000004734 dated Oct. 24, 2018.

* cited by examiner

*Primary Examiner* — Christopher J Besler
(74) *Attorney, Agent, or Firm* — Reed Smith LLP

(57) ABSTRACT

A wheel hub unit having a rotatable hub provided with an axially outer flange and a bearing unit. The bearing unit providing a radially outer ring, a radially inner ring and a plurality of rolling bodies positioned respectively between the radially outer ring and the hub and between the radially outer ring and the radially inner ring. The radially inner ring has a finished axial length which ensures a predetermined value of an axial preload of the bearing unit and a finished axial length is defined by the following formula: $X'=(X+\Delta X)-\Delta X1$

3 Claims, 3 Drawing Sheets

FLANGED WHEEL HUB UNIT AND ASSEMBLY METHOD

CROSS-REFERENCE

This application claims priority to Italian patent application no. 102018000004734 filed on Apr. 20, 2018, the contents of which are fully incorporated herein by reference.

TECHNOLOGICAL FIELD

The present invention relates to a wheel hub unit and an associated method for assembly thereof. The present invention is suitable in particular, although not exclusively, for the wheel hub units of motor vehicles, the units being provided with a rolling bearing. These applications comprise both the case where the outer ring of the bearing is rotating, while the inner ring of the bearing is fixed, and the opposite case where the inner ring rotates and the outer ring is fixed. The invention is also suitable for any type of rolling body (balls, rollers, tapered rollers, etc.).

BACKGROUND

Wheel hub units of the flanged type for mounting on the driving wheels of a motor vehicle are already known from the prior art. The document EP 2 602 123 A1, for example, describes a wheel hub unit, which is in this case asymmetrical, for the wheel of a motor vehicle, the unit comprising a flanged hub rotatable about an axis of rotation, a flange integral with the flanged hub and transverse to the axis of rotation, a stationary ring arranged radially on the outside of the flanged hub and provided with raceways axially spaced from each other, and two rows of rolling bodies (for example balls) arranged between the stationary ring and the flanged hub. The flanged hub forms integrally a radially inner raceway for the axially outer row of balls, while the radially inner raceway for the axially inner row of balls is formed on an inner ring of the bearing, mounted radially on the outside of the flanged hub.

For correct operation of this unit the inner ring of the bearing must be mounted so as to ensure an axial preload acting on the unit.

The axial preload is a force which acts between the rolling bodies and the rings of the bearings and is not determined by external loads. It may be regarded as a negative internal play.

Depending on the application, the degree of the preload is variable. A preload may be necessary, for example, if a high degree of rigidity or position control is required. Similarly, the preload may be required in order to ensure a minimum load in the case of outer loads which are very light or not present on the bearing during use.

Further reasons for applying the preload are: reduction in the noisiness, increasing the working life of the bearing, greater degree of rolling precision, no slipping in high-speed applications, during rapid starting and stopping.

Since the values of the preload are very small, determination of the correct preload is a complex procedure; it requires the carrying out of numerous precision measurements with consequent long times needed for assembly of the unit and the possibility of evaluating an incorrect preload due to the inevitable measurement errors. The amount of axial preload is of the order 5-35 µm and, in the light of the above comments, this tolerance range cannot be further reduced.

FIG. 1 shows in schematic form a wheel hub unit with the main components: the radially outer ring 31, the flanged hub 20, the radially inner ring 34 and the rows of balls 32, 33. After initial preassembly of the unit with sample components, the following must be checked:

the value FOR, i.e. distance between the points of contact of the balls 32, 33 with the radially outer ring 31;

the value FIR+SIR, sum of the distance between the points of contact of the balls 32, 33 with the hub 20 and the inner ring 34, respectively;

the axial clearance y between ball 33 and inner ring 34, which, at the end of assembly, must be negative in order for there to be an axial preload.

According to the prior art there are two possible solutions for obtaining the axial preload required by the specific application:

a first solution consists in using a ball with a predetermined diameter and dividing up the radially inner ring into categories depending on the value of its axial length. Based on the measurements performed the ring belonging to the category which ensures the correct preload will be selected and mounted;

the second solution is dual in nature compared to the first solution and consists in using a radially inner ring with a predetermined axial length and dividing up the balls into categories depending on the value of the diameter. Based on the measurements performed the ball belonging to the category which ensures the correct preload will be selected and mounted.

Whatever the choice made, it will involve solutions which require complex management of these parts sorted into categories for different reasons, namely both in terms of production time and in terms of production line space, warehouse management and supplier management. Moreover, owing to the inevitable measurement errors, the tolerance range is, as has been seen, relatively large and in any case of the same order of magnitude as the absolute preload value.

There therefore exists the need to design a wheel hub unit and associated assembly method which do not have the aforementioned drawbacks and which in particular are able to ensure that an axial preload with an absolute value and tolerances suitable for the needs of motor-vehicle manufacturers may be obtained.

SUMMARY

The object of the present invention is to provide a wheel hub unit which does not have the aforementioned drawbacks. In particular, the unit is provided with a rolling bearing, the radially inner ring of which has a nominal axial length which can be machined by a finite amount so as to ensure the correct value of the axial preload.

According to a first aspect of the present invention, therefore, a wheel hub unit provided with a rolling bearing having the characteristic features described in the attached independent product claim is described.

According to another aspect, a method for assembly of a wheel hub unit having the characteristic features described in the attached independent method claim is described.

Further preferred and/or particularly advantageous embodiments of the invention are described in accordance with the characteristic features indicated in the attached dependent claims.

BRIEF DESCRIPTION OF THE DRAWINGS

The invention will now be described with reference to the attached drawings which illustrate a non-limiting example of embodiment thereof, in which.

DETAILED DESCRIPTION

Figure 1:
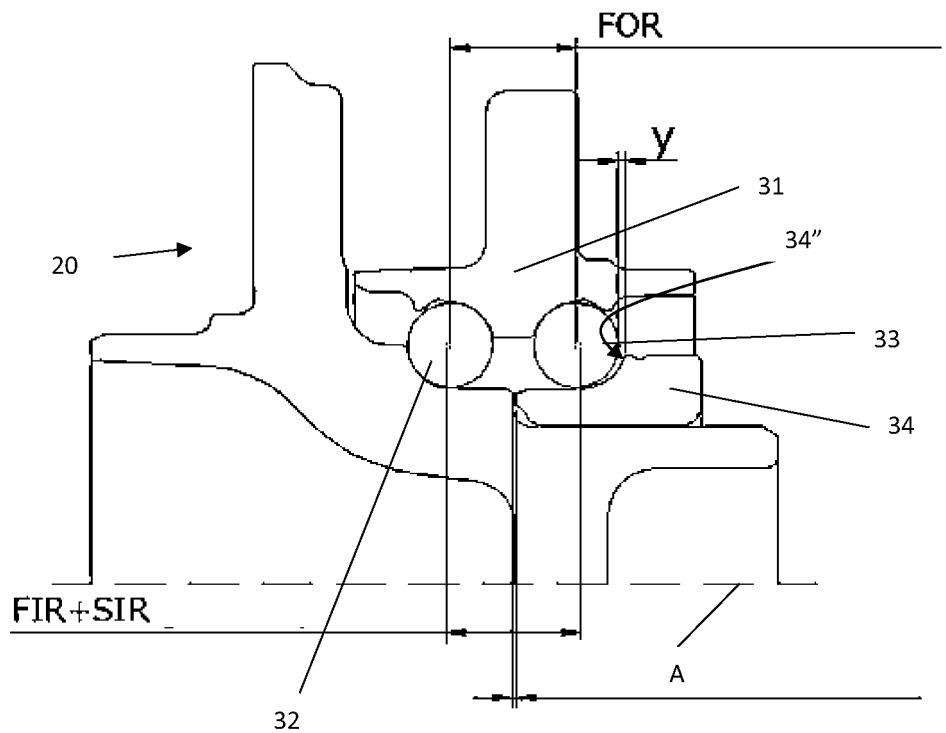
FIG. 1 schematically shows a wheel hub unit, in which the assembly method and the associated axial preload are realized according to the prior art.
Figure 2:
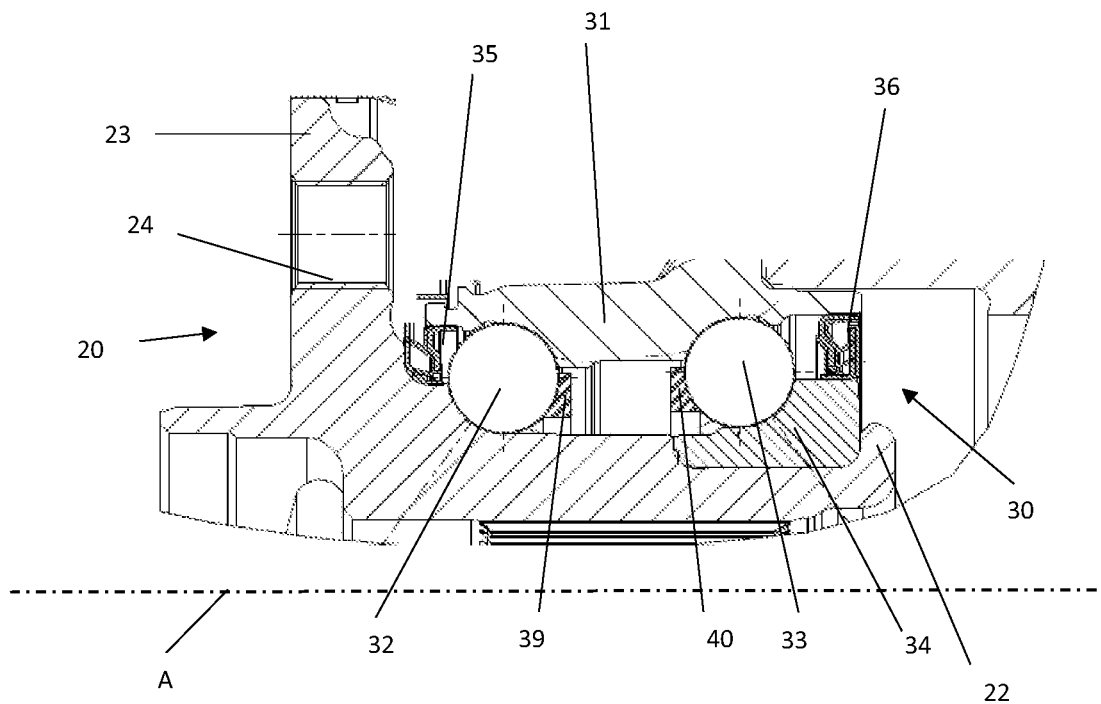
FIG. 2 shows a partial axial-symmetrical section through the wheel hub unit provided with a rolling bearing according to a mode of implementation of the present invention.

With reference to FIG. 2, 10 denotes in its entirety a wheel hub unit according to a preferred embodiment of the invention. As mentioned in the introduction, the invention is applicable not only to the configuration described below, but generally to any wheel hub unit for motor vehicles.

The unit 10 comprises a hub 20 which is preferably, but not necessarily, rotatable and a bearing unit 30. The hub 20 is configured to assume also the function of an inner rolling ring of the bearing. In the whole of the present description and in the claims, the terms and expressions indicating positions and orientations such as "radial" and "axial" are understood as referring to the central axis of rotation A of the bearing unit 30. Expressions such as "axially outer" and "axially inner" refer instead to the assembled condition and, in the specific case, preferably refer to a wheel side and, respectively, to a side opposite side to the wheel side.

The bearing unit 30 comprises a radially outer ring 31 which is stationary and provided with respective radially outer raceways, at least one radially inner ring 20, 34 which is rotatable and provided with respective radially inner raceways, and two rows of rolling bodies 32, 33, in this example balls. The axially outer row of rolling bodies 32 is arranged between the radially outer ring 31 and the hub 20 with the function of a radially inner ring, while the axially inner row of rolling bodies 33 is arranged between the radially outer ring 31 and the radially inner ring 34. For the sake of easier illustration, the reference numbers 32, 33 will be used to identify both the single balls and the row of balls and in particular 32 will indicate the axially outer row of balls or single ball, while 33 will indicate the axially inner row of balls or single ball. Again, for the sake of simplicity, the term "ball" may be used by way of example in the present description and in the attached drawings instead of the more generic term "rolling body" (and likewise the same reference numbers will also be used). It will be understood always that, instead of balls, any other rolling body (for example, rollers, tapered rollers, needle rollers, etc.) may be used.

The bearing unit 30 is sealed by suitably designed sealing elements 35, 36 which are sliding sealing elements, as per the prior art. The rolling bodies of the rows 32, 33 are kept in position by corresponding cages 39, 40.

The hub 20 defines at its axially inner end a rolled edge 22 which is configured to preload axially the inner ring 34. The hub 20 also has an axially outer flange portion 23. The flange portion has a plurality of axial fixing holes 24. These holes are the seats for corresponding fixing means (for example stud bolts, not shown in the figures) which connect in a known manner a part of the motor vehicle wheel, for example the brake disc (also known per se and not shown in the figures), to the hub 20.

Figure 3:
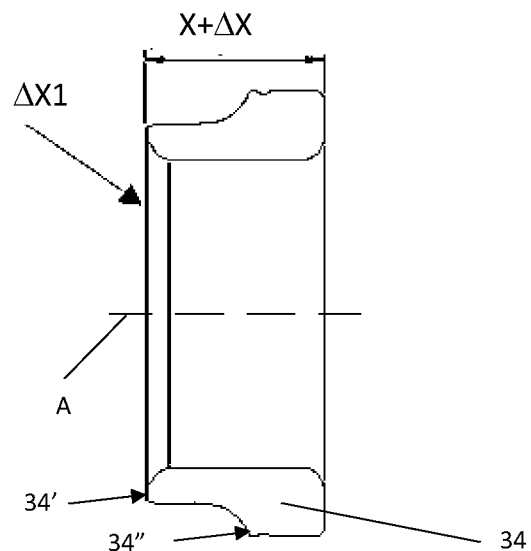
FIG. 3 shows in schematic form the radially inner ring of the unit shown in FIG. 2.

With reference to FIG. 3, the wheel hub unit according to the invention is distinguished in that the radially inner ring 34, in a semifinished form, has a nominal axial length X increased by an amount equal to ΔX which represents the oversize thickness, a predetermined amount of which will then be removed. The value of ΔX, purely by way of example, may range between 0.05 mm and 0.1 mm. The oversize thickness actually removed ΔX1 may be less than or greater than the value of ΔX, depending on the specific application, the preload value μ required and the tolerances of the axial lengths of the components. Consequently, the finished axial length X' of the radially inner ring may be greater than or less than the nominal axial length X.

Figure 4:
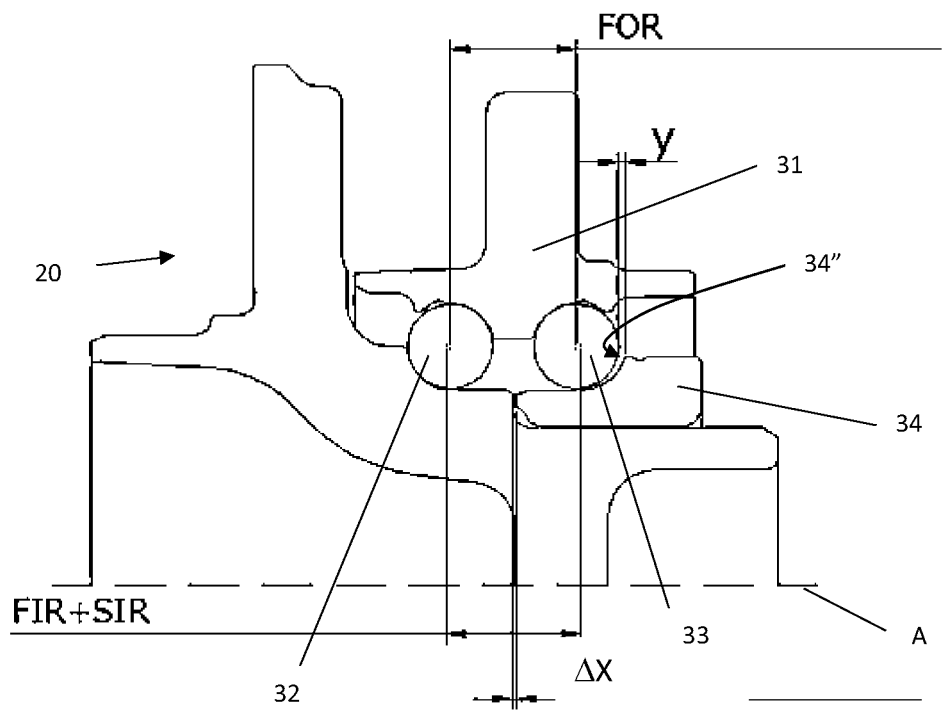
FIG. 4 shows a step during assembly of the unit according to FIGS. 2.

With reference to FIG. 4 the assembly method according to the present invention envisages preassembly of the inner ring with a length X+ΔX and the measurement of the axial clearance y between the shoulder edge 34" of the radially inner ring 34 in the semifinished configuration, and the ball 33, more precisely the axially inner end of the ball 33.

The radially inner ring will then be disassembled. Based on the measurement of the axial clearance y the amount of the oversize ΔX1 to be removed from the axially outer annular surface 34' of the radially inner ring 34 in order to obtain the correct axial preload is calculated. Clearly it is necessary for:

$$\Delta X1 > y$$

and the difference between the two parameters forms the value of the preload μ required by the application. Once it has been adjusted to its finished value, for example, by means of precision-machining, the radially inner ring may be definitively assembled on the wheel hub unit.

Figure 5:
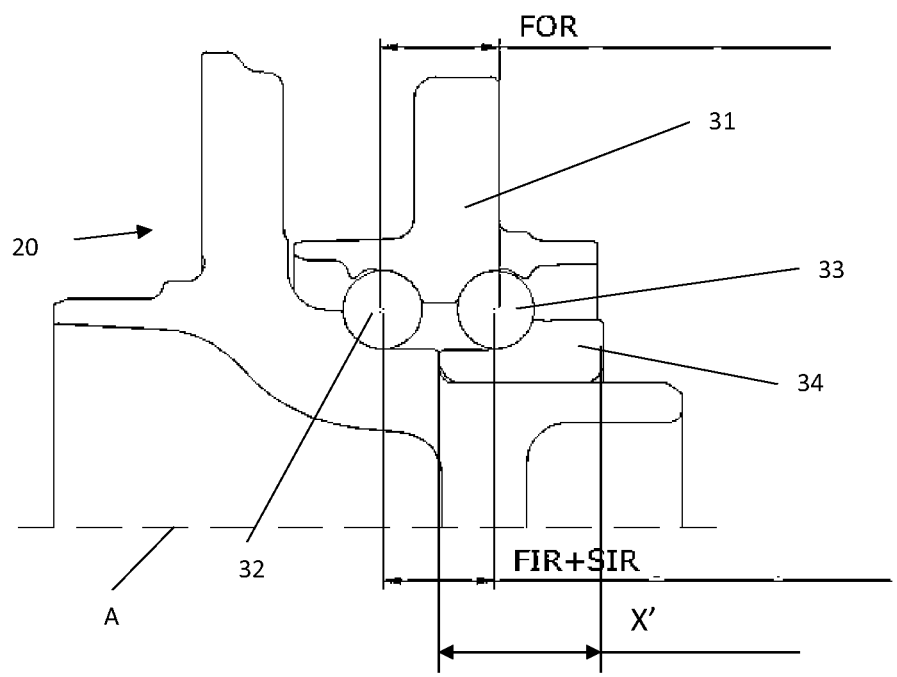
FIG. 5 shows in schematic form a further step during assembly of the unit according to FIG. 2.

With reference to FIG. 5, the finished axial length of the radially inner ring 34 will therefore be X', whereby the following relation applies:

$$X' = (X + \Delta X) \Delta X1$$

where, it is stated again:

X: the nominal axial length of the radially inner ring 34
ΔX: oversize available
ΔX1: oversize removed
X': the finished axial length of the radially inner ring 34

To summarize, the solution according to the invention is that of adjusting the annular surface 34' of the radially inner ring 34 so that it assumes a finished axial length X' such as to ensure the correct preload value, according to the following assembly method:

assembling the radially inner ring 34 provided with an available oversize ΔX, a predetermined amount of which is to be removed, where the value of the oversize removed ΔX1 may be less than or greater than the value of the available oversize ΔX, measuring the axial clearance y of the bearing, between the shoulder edge 34" of the radially inner ring 34 and the axially inner end of the ball 33, disassembling the radially inner ring from the bearing 30, calculating the oversize ΔX1 to be removed from the surface 34' of the radially inner ring 34, where $$\Delta X1 = y + \square$$

adjusting the axially outer annular surface 34 of the radially inner ring 34 until a value of the removed oversize equal to ΔX1 is obtained, final assembly of the radially inner ring 34 on the bearing, with a finished axial length X' which ensures the correct axial preload value.

The many advantages which may be obtained by the present invention are clear. In particular, as a result of the invention it is possible to avoid the presence and the management of huge warehouse stocks of the various categories of radially inner rings or, alternatively, categories of balls. Moreover, since according to this method, it is not required to use "sample" components and therefore the radially inner ring is mounted together with the components which will actually form the bearing, it is possible to reduce the spread of the measurements and increase the process capability. The method does not require investment in new production lines since it is possible to use the existing ones. Finally, since the division of the radially inner ring (or balls) into categories may be avoided, the space requirement of the production line will be significantly reduced.

In addition to the embodiments of the invention, as described above, it is to be understood that numerous further variants are possible. It must also be understood that said embodiments are only examples and do not limit the subject of the invention, nor its applications, nor its possible configurations. On the contrary, although the description provided above enables the person skilled in the art to implement the present invention at least in one of its examples of configuration, it must be understood that numerous variations of the components described are feasible, without thereby departing from the scope of the invention, as defined in the accompanying claims, interpreted literally and/or in accordance with their legal equivalents.

What is claimed is:

1. A method of assembling a wheel hub unit for motor vehicles, comprising:
   providing a rotatable hub, and
   a bearing unit having:
     a radially outer ring,
     a radially inner ring, and
     a plurality of rolling bodies respectively positioned between the radially outer ring and the hub and between the radially outer ring and the radially inner ring,
   the method being suitable for ensuring a predetermined value of an axial preload ($\mu$) of the bearing unit and comprising the following steps:
     assembling the radially inner ring in a semifinished configuration provided with an available oversize ($\Delta X$), a predetermined amount of which is to be removed from an axially outer annular surface of the radially inner ring,
     measuring an axial clearance of the bearing unit present between a shoulder edge of the radially inner ring and an axially inner end of the rolling bodies,
     disassembling the radially inner ring from the bearing unit,
     calculating a portion of the available oversize to be removed from the axially outer annular surface of the radially inner ring, the value of the oversize to be removed being equal to a sum of the value of the axial clearance and the predetermined value of the axial preload ($\mu$).
     removing from the axially outer annular surface of the radially inner ring the oversize to be removed,
     assembling the radially inner ring in a finished configuration on the bearing unit, wherein the radially inner ring has a finished axial length which ensures the predetermined value of the axial preload ($\mu$) of the bearing unit.

2. The method according to claim 1, wherein the finished axial length of the radially inner ring is calculated as follows:

$$X'=(X+\Delta X)-\Delta X1$$

wherein:
$X$: nominal axial length of the radially inner ring,
$\Delta X$: oversize available on an axially outer annular surface of the radially inner ring,
$\Delta X1$: oversize removed from the axially outer annular surface of the radially inner ring.

3. The method according to claim 1, wherein the radially inner ring is configured to be realized from a semifinished element having an axial length ($X+\Delta X$), which is a sum of the nominal axial length ($X$) and the available oversize ($\Delta X$) on the axially outer annular surface of the radially inner ring.

* * * * *